(12) United States Patent
Majied et al.

(10) Patent No.: US 9,315,322 B1
(45) Date of Patent: Apr. 19, 2016

(54) WAREHOUSE SHUTTLE DEVICES, AND SYSTEMS AND METHODS INCORPORATING THE SAME

(71) Applicants: Fadi Mohammad Majed Hussain Abdel Majied, Jeddah (SA); Eyad M. Yunis, Columbus, OH (US)

(72) Inventors: Fadi Mohammad Majed Hussain Abdel Majied, Jeddah (SA); Eyad M. Yunis, Columbus, OH (US)

( * ) Notice: Subject to any disclaimer, the term of this patent is extended or adjusted under 35 U.S.C. 154(b) by 0 days.

(21) Appl. No.: 14/718,474

(22) Filed: May 21, 2015

(51) Int. Cl.
 *B65G 1/04* (2006.01)
 *B65G 65/08* (2006.01)
 *B65G 1/137* (2006.01)
 *B65G 65/00* (2006.01)

(52) U.S. Cl.
 CPC .............. *B65G 1/137* (2013.01); *B65G 1/0478* (2013.01); *B65G 65/005* (2013.01); *B65G 65/08* (2013.01); *B65G 2203/0283* (2013.01); *B65G 2812/12* (2013.01); *B65G 2814/0313* (2013.01)

(58) Field of Classification Search
 CPC ...... B65G 1/137; B65G 1/0478; B65G 1/065; B65G 65/08; B65G 65/005; B65G 2203/0283; B65G 2812/12; B65G 2814/0313; E04H 6/422
 USPC .................... 414/331.03, 234, 236, 239, 679; 700/217
 See application file for complete search history.

(56) References Cited

U.S. PATENT DOCUMENTS

| | | | | |
|---|---|---|---|---|
| 3,554,389 A | * | 1/1971 | Bright | 414/236 |
| 3,802,581 A | | 4/1974 | Frederick | |
| 4,328,422 A | * | 5/1982 | Loomer | 250/239 |
| 4,470,742 A | * | 9/1984 | Schindler | 414/286 |
| 5,190,427 A | * | 3/1993 | Lai | 414/278 |
| 5,395,199 A | | 3/1995 | Day, III et al. | |
| 5,556,246 A | * | 9/1996 | Broshi | 414/278 |
| 5,707,199 A | * | 1/1998 | Faller | 414/239 |
| 5,857,413 A | | 1/1999 | Ward | |
| 6,842,665 B2 | | 1/2005 | Karlen | |
| 6,851,921 B2 | * | 2/2005 | Haag | 414/800 |
| 7,168,905 B1 | * | 1/2007 | Solomon et al. | 414/237 |
| 7,203,570 B2 | | 4/2007 | Karlen | |
| 7,815,031 B2 | | 10/2010 | Schneider | |
| 8,457,780 B2 | | 6/2013 | Kharkover | |

(Continued)

FOREIGN PATENT DOCUMENTS

EP 0768657 B1 3/2003
WO 2007104632 A1 9/2007

OTHER PUBLICATIONS

"Puzzle-Based Storage Systems"; Kevin R. Gue & Byung Soo Kim; Department of Industrial & Systems Engineering, Auburn University, Auburn, AL 36849-5346; Feb. 6, 2007; pp. 1-28.

*Primary Examiner* — Dean Kramer
(74) *Attorney, Agent, or Firm* — Benesch, Friedlander, Coplan & Aronoff, LLP

(57) ABSTRACT

A system for moving pallets can include a rectangular grid, pallets, a shuttle device, a motive assembly, and one or more processors. The pallets can be arranged upon a matrix of cells of the rectangular grid. The one or more processors can be communicatively coupled to the shuttle device and the motive assembly. The one or more processors can execute machine readable instructions to activate a vertical actuator to urge the pallet engagement member of the shuttle device into engagement with a shuttle engagement member of a selected pallet of the pallets. The motive assembly can be actuated to slide the selected pallet along the rectangular grid, while the pallet engagement member of the shuttle device and the shuttle engagement member of the selected pallet are engaged.

18 Claims, 8 Drawing Sheets

(56) References Cited

U.S. PATENT DOCUMENTS

| | | | |
|---|---|---|---|
| 8,538,692 B2 * | 9/2013 | Wurman et al. | 701/532 |
| 2007/0056831 A1 * | 3/2007 | Sullivan | 198/774.1 |
| 2008/0075569 A1 | 3/2008 | Benedict et al. | |
| 2010/0247275 A1 | 9/2010 | Karlen et al. | |

* cited by examiner

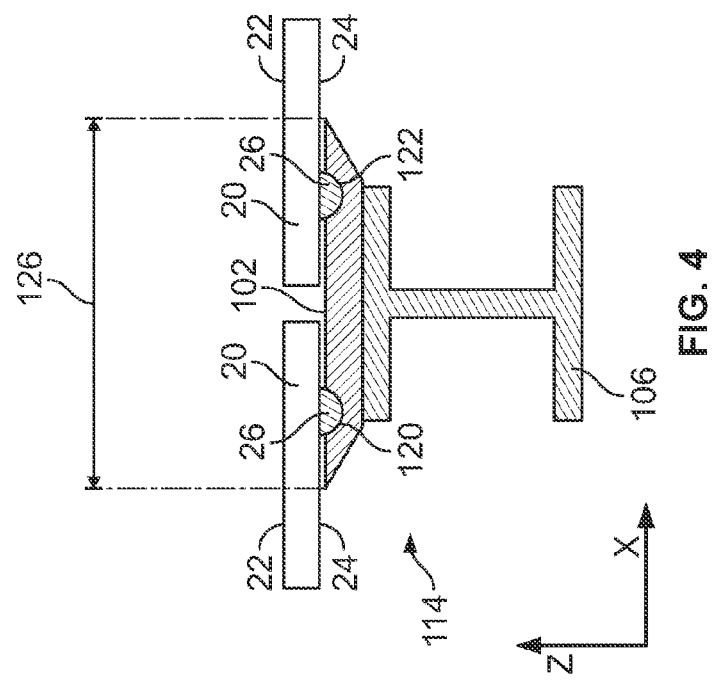
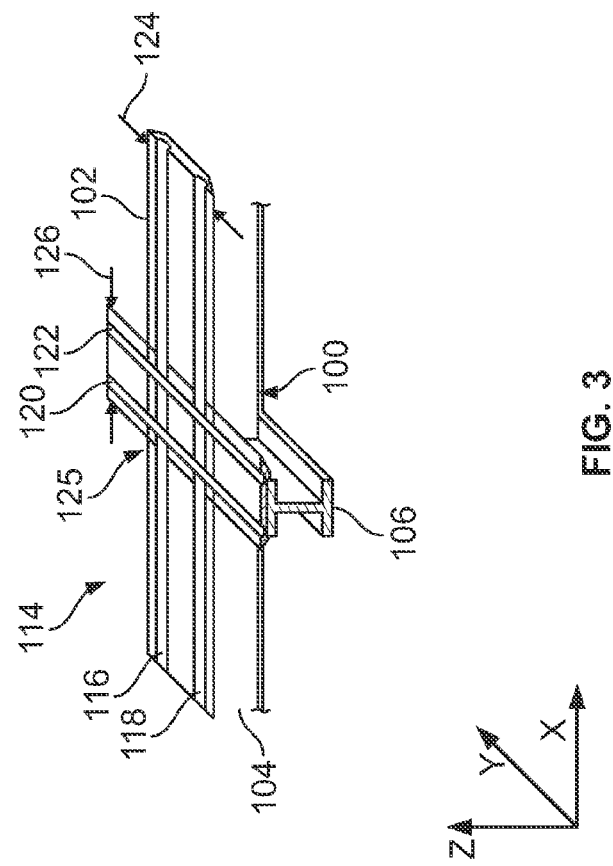

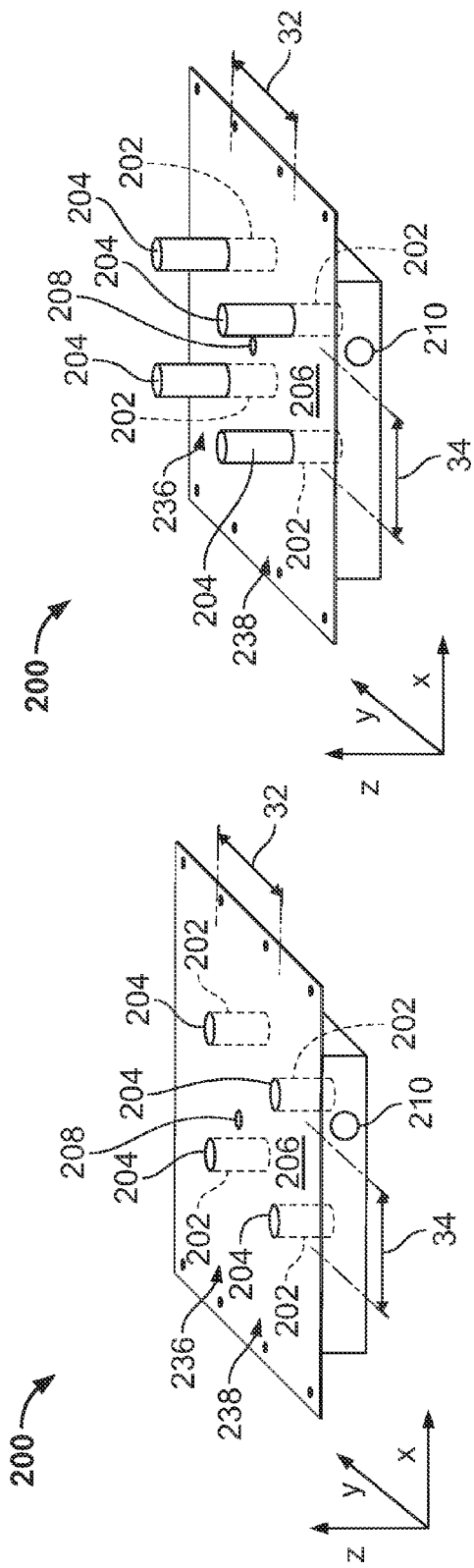
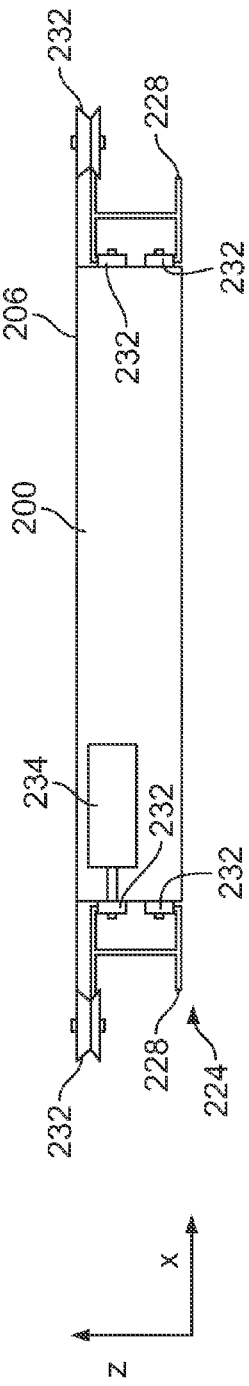
FIG. 8A
FIG. 8B
FIG. 9

WAREHOUSE SHUTTLE DEVICES, AND SYSTEMS AND METHODS INCORPORATING THE SAME

BACKGROUND

The present specification generally relates to systems and methods for moving pallets and, more specifically, to systems and methods for moving pallets throughout a warehouse.

Traditional warehouse facilities generally include a plurality of racks for storing goods. The racks can be separated by roads or aisles that provide access to the racks for loading or unloading goods from the racks. For example, a pair of racks can be separated by a road. The roads can be designed to accommodate forklift traffic. Accordingly, the road and the portion of the warehouse above the road cannot be utilized for storage. Moreover, the forklifts are frequently manually operated. Human operators can be prone to mistakes in material handling. In addition, manual operation can provide a direct payroll cost that can increase the cost to operate a warehouse.

Accordingly, a need exists for alternative systems and methods for moving pallets to provide for efficient storage and retrieval of goods within a warehouse.

SUMMARY

In one embodiment, a system for moving pallets can include a rectangular grid, pallets, a shuttle device, a motive assembly, and one or more processors. The rectangular grid can include lateral rails oriented along an x-axis and orthogonal rails oriented along a y-axis. The lateral rails and the orthogonal rails can intersect to demarcate a matrix of cells. The pallets can be arranged upon the matrix of cells of the rectangular grid. Each of the pallets can include an underside that faces the rectangular grid and a shuttle engagement member located on the underside. The shuttle device can be suspended beneath the pallets and the rectangular grid. The shuttle device can include a vertical actuator that urges a pallet engagement member vertically. The motive assembly can be suspended beneath the pallets and the rectangular grid. The motive assembly can move the shuttle device. The one or more processors can be communicatively coupled to the shuttle device and the motive assembly. The one or more processors can execute machine readable instructions to activate the vertical actuator to urge the pallet engagement member of the shuttle device into engagement with the shuttle engagement member of a selected pallet of the pallets. The motive assembly can be actuated to slide the selected pallet along the rectangular grid, while the pallet engagement member of the shuttle device and the shuttle engagement member of the selected pallet are engaged.

In another embodiment, a method for moving pallets can include engaging a shuttle engagement member disposed on an underside of a pallet with pallet engagement members of a shuttle device. The pallet can be in sliding engagement with a rectangular grid that demarcates a matrix of cells. The underside of the pallet can face the rectangular grid. The shuttle device can be moved beneath the rectangular grid and along a direction of motion. The pallet can be slid along rectangular grid, while the shuttle engagement member of the pallet is engaged with the pallet engagement members of the shuttle device. A leading set of pallet engagement members and a trailing set of pallet engagement members can be identified from the pallet engagement members, automatically with one or more processors, based at least in part upon the direction of motion.

In yet another embodiment, a warehouse can include one or more processors and multiple floors. Each of the floors of the warehouse can include a rectangular grid, pallets, a shuttle device, and a motive assembly. The rectangular grid can include lateral rails oriented along an x-axis and orthogonal rails oriented along a y-axis. The lateral rails and the orthogonal rails can intersect to demarcate a matrix of cells. The pallets can be arranged upon the matrix of cells of the rectangular grid. Each of the pallets can include an underside that faces the rectangular grid and a shuttle engagement member located on the underside. The shuttle device can be suspended beneath the pallets and the rectangular grid. The shuttle device can include a vertical actuator that urges a pallet engagement member vertically. The motive assembly can be suspended beneath the pallets and the rectangular grid. The motive assembly can direct or move the shuttle device. The one or more processors can be communicatively coupled to the shuttle device and the motive assembly. The one or more processors can execute machine readable instructions to activate the vertical actuator to urge the pallet engagement member of the shuttle device into engagement with the shuttle engagement member of a selected pallet of the pallets. The motive assembly can be actuated to slide the selected pallet along the rectangular grid, while the pallet engagement member of the shuttle device and the shuttle engagement member of the selected pallet are engaged.

According to any of the systems, methods or warehouses provided herein, the rectangular grid can include pallet tracks that constrain the pallets in sliding engagement with the rectangular grid. Alternatively or additionally, the pallet tracks can include a first lateral track and a second lateral track located on one of the lateral rails. The first lateral track and the second lateral track can demarcate different cells of the matrix of cells. Alternatively or additionally, the pallet tracks can include a first orthogonal track and a second orthogonal track located on one of the orthogonal rails. The first orthogonal track and the second orthogonal track can demarcate different cells of the matrix of cells. Alternatively or additionally, each of the pallets can include a sliding member located on the underside of the pallet. The sliding member of each of the pallets can be constrained by one of the pallet tracks. Alternatively or additionally, the sliding member can include a ball bearing.

According to any of the systems, methods or warehouses provided herein, the matrix of cells can include an unoccupied cell that is unobstructed by the pallets. The selected pallet can be positioned in a cell of the matrix of cells that is adjacent to the unoccupied cell, before the pallet engagement member of the shuttle device and the shuttle engagement member of the selected pallet are engaged. The selected pallet can slide towards the unoccupied cell, while the pallet engagement member of the shuttle device and the shuttle engagement member of the selected pallet are engaged.

According to any of the systems, methods or warehouses provided herein, the motive assembly can include a lateral dimension actuator that moves the shuttle device along the x-axis and an orthogonal dimension actuator that moves the shuttle device along the y-axis. Alternatively or additionally, the lateral dimension actuator, the orthogonal dimension actuator, or both can include a linear bearing.

According to any of the systems, methods or warehouses provided herein, the vertical actuator can be a hydraulic actuator.

According to any of the systems, methods or warehouses provided herein, the rectangular grid can be provided as a floor of a warehouse.

According to any of the systems, methods or warehouses provided herein, the shuttle engagement member can include latching features that are each arranged at a corner of a rectangular pattern.

According to any of the systems, methods or warehouses provided herein, the underside of each of the pallets can be rectangular and can include an identification device that is positioned centrally.

According to any of the systems, methods or warehouses provided herein, the pallets can include a flat-bed shelf, a box-style shelf, a cabinet-style shelf, or a combination thereof.

According to any of the systems, methods or warehouses provided herein, the rectangular grid can include an intersecting rail that is orthogonal to the direction of motion. The leading set of pallet engagement members can be disengaged from the shuttle engagement member as the pallet slides over the intersecting rail and while the shuttle engagement member of the pallet is engaged with the trailing set of pallet engagement members.

According to any of the systems, methods or warehouses provided herein, the rectangular grid can include an intersecting rail that is orthogonal to the direction of motion. The trailing set of pallet engagement members can be disengaged from the shuttle engagement member as the pallet slides over the intersecting rail and while the shuttle engagement member of the pallet is engaged with the leading set of pallet engagement members.

According to any of the systems, methods or warehouses provided herein, an identification device located on the underside of the pallet can be detected with an optical sensor of the shuttle device.

According to any of the systems, methods or warehouses provided herein, a distance sensor of the shuttle device and the motive assembly can be communicatively coupled to the one or more processors. A mapped location of a selected cell of the matrix of cells can be provided. The shuttle device can be moved, automatically by the one or more processors, to the mapped location with the motive assembly. A detected position of the shuttle device can be detected with the distance sensor. The mapped location and the detected position can be compared, automatically with the one or more processors.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 schematically depicts enlarged view 3 of the rectangular grid of FIG. 2 according to one or more embodiments shown and described herein;

FIG. 4 schematically depicts a cross sectional view of the system of FIG. 1 taken along line 4-4 according to one or more embodiments shown and described herein;

FIGS. 8A and 8B schematically depict a shuttle device according to one or more embodiments shown and described herein;

FIG. 9 schematically depicts a cross sectional view of the shuttle device and the motive assembly of FIG. 2 taken along line 9-9 according to one or more embodiments shown and described herein;

DETAILED DESCRIPTION

The embodiments described herein generally relates to a system and method for selectively accessing pallets arranged upon a rectangular grid. The rectangular grid can comprise a plurality of lateral rails and a plurality of orthogonal rails. The rails can intersect one another to demarcate a matrix of cells that are formed by the rectangular grid. Various embodiments of the system and the operation of the system will be described in more detail herein.

Figure 1:
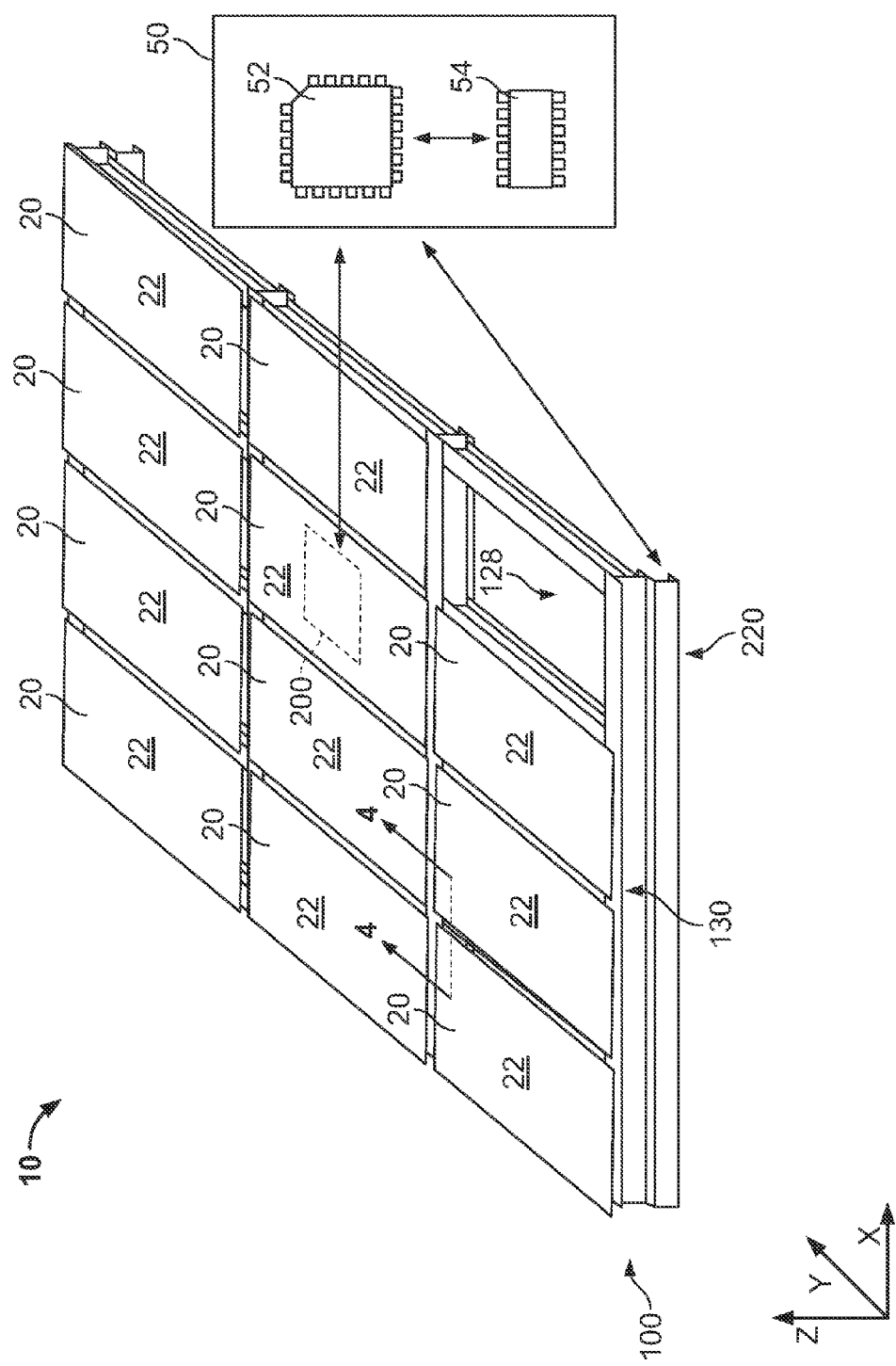
FIG. 1 schematically depicts a system for moving pallets according to one or more embodiments shown and described herein.
Figure 2:
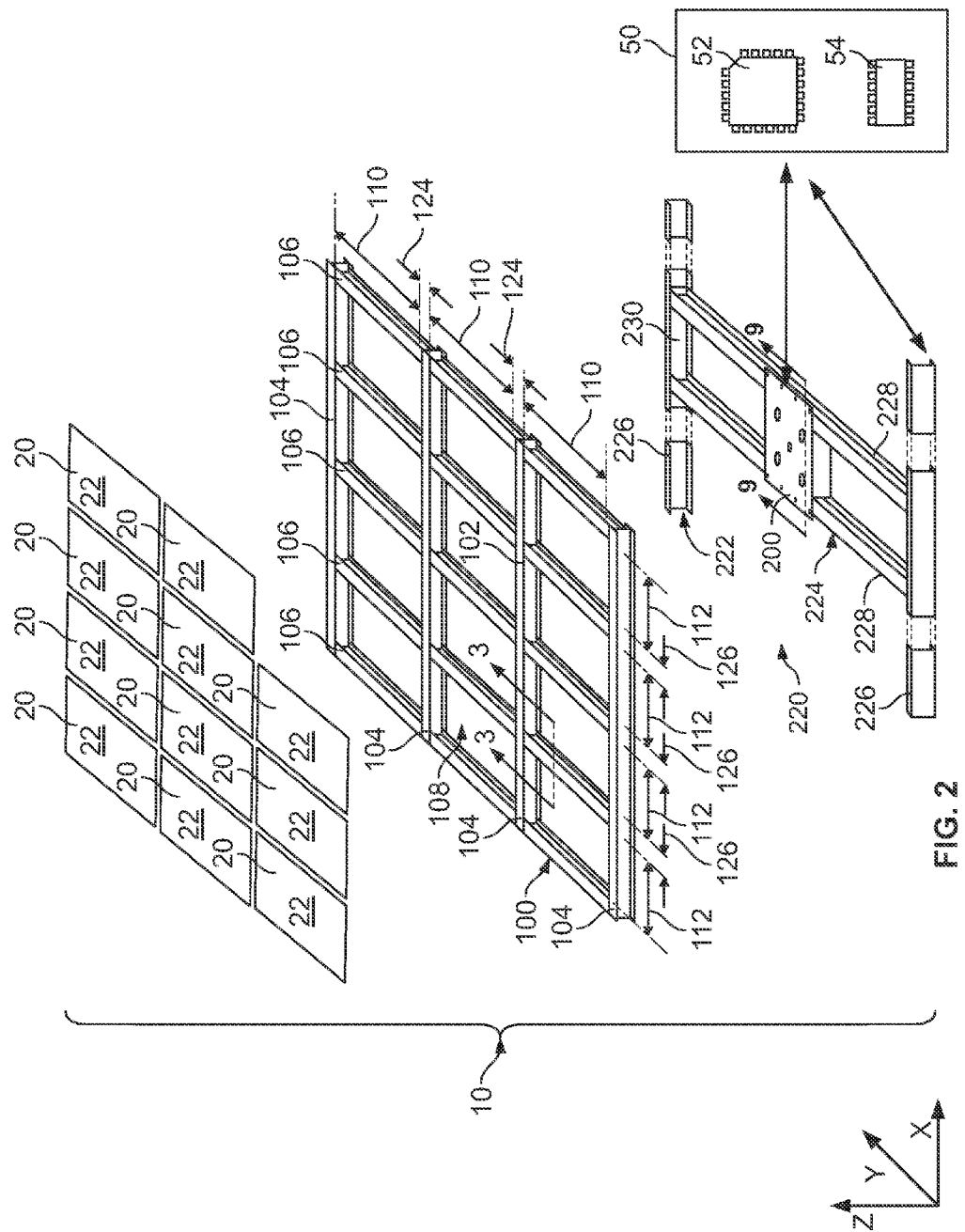
FIG. 2 schematically depicts an exploded view of the system of FIG. 1 according to one or more embodiments shown and described herein.

Referring collectively to FIGS. 1 and 2, an embodiment of a system 10 for moving pallets 20 to provide for efficient storage and retrieval of goods. For example, the embodiments of the system 10 provided herein can be utilized to improve the usage of the storage volume within a facility such as, for example, a warehouse. The system 10 can comprise a rectangular grid 100 that organizes and constrains the motion of the pallets 20. In some embodiments, the rectangular grid 100 can form a pallet interface 102 configured to contact the pallets 20.

The rectangular grid 100 can comprise lateral rails 104 oriented along an x-axis, i.e., the lateral rails 104 can extend along a span and can be substantially aligned with the x-axis. The rectangular grid 100 can further comprise orthogonal rails 106 oriented along a y-axis. In some embodiments, the lateral rails 104 and the orthogonal rails 106 can be coupled to one another in order to provide structure for rectangular grid 100. In some embodiments, the lateral rails 104, the orthogonal rails 106, or both can be formed from relatively rigid material such as, for example, metal (e.g., steel), wood, or the like. Moreover, the lateral rails 104, the orthogonal rails 106, or both can be shaped such that the rectangular grid 100 is substantially planar and is configured to resist bending or twisting when subjected to loads. Accordingly, the lateral rails 104, the orthogonal rails 106, or both can be formed as beams such as, but not limited to, an I-beam.

The lateral rails 104 and the orthogonal rails 106 can intersect to demarcate a matrix of cells 108. In some embodiments, the lateral rails 104 and the orthogonal rails 106 can intersect at a substantially orthogonal angle. Thus, each of the lateral rails 104 can be separated by a length span 110. Likewise, each of the orthogonal rails 106 can be separated by a width span 112. The lateral rails 104 can extend across the width span 112 and the orthogonal rails 106 can extend across the length span 110. Accordingly, the lateral rails 104 and the orthogonal rails 106 can cooperate to demarcate the matrix of cells 108. As used herein, the term "matrix" can mean an array of similarly dimensioned rectangular objects that are repeated along a first dimension and a second dimension. For example, the rectangular grid 100 can define a substantially x-y plane that it divided into a plurality of substantially rectangular cells to form the matrix of cells 108.

Accordingly, the matrix of cells 108 can comprise a first dimension of n cells arranged along the x-axis to form a row and a second dimension of m cells arranged along the y-axis to form a column. Thus, the n-by-m matrix can comprise n columns and m rows of cells. For clarity, and not by way of limitation, the matrix of cells 108 is depicted in FIGS. 1 and 2 as a 4-by-3 matrix, where n=4 and m=3 (i.e., a matrix having 4 columns and 3 rows). It is noted that the matrix of cells 108 can be formed into an n-by-m matrix of any suitable n dimension and/or m dimension without departing from the embodiments described herein. It is furthermore noted that the lateral rails 104 should be suitable to support the combined weight of the pallets 20 and goods supported by the pallets 20 across the width span 112 without obstructing the motion of a shuttle device 200. Likewise, the orthogonal rails 106 should be suitable to support the combined weight of the pallets 20 and goods support by the pallets 20 across the length span 110 without obstructing the motion of the shuttle device 200.

Referring collectively to FIGS. 2, 3 and 4, the rectangular grid 100 can comprise pallet tracks 114 that are configured to constrain the motion of the pallets 20. Specifically, the pallet tracks 114 can be configured to constrain the pallets 20 in sliding engagement with the rectangular grid 100. In some embodiments, the pallet tracks 114 can run along substantially entire span of each of the lateral rails 104 and the orthogonal rails 104. Accordingly, the pallet tracks 114 can provide a path for each of the pallets 20 to travel to a desired cell of the matrix of cells 108. In some embodiments, each of the pallet tracks 114 can be formed as a linear groove that is recessed within a substantially planar surface of the pallet interface 102.

Referring collectively to FIGS. 2 and 3, the pallet tracks 114 can comprise a first lateral track 116 and a second lateral track 118 located on one of the lateral rails 104. In some embodiments, the first lateral track 116 and the second lateral track 118 can demarcate different cells of the matrix of cells 108. Specifically, the first lateral track 116 can be offset from the second lateral track 118 with respect to the y-axis such that the pallets 20 constrained by the first lateral track 116 occupy different cells than the pallets 20 constrained by the second lateral track 118. In some embodiments, the first lateral track 116 and the second lateral track 118 can be substantially parallel. Thus, each width span 112 of the lateral rails 104 can be configured to constrain two pallets 20 contemporaneously. Additionally, the pallet tracks 114 can comprise a first orthogonal track 120 and a second orthogonal track 122 located on one of the orthogonal rails 106. In some embodiments, the first orthogonal track 120 and the second orthogonal track 122 can demarcate different cells of the matrix of cells 108. In some embodiments, the first orthogonal track 120 can be offset from the second orthogonal track 122 with respect to the x-axis. Alternatively or additionally, the first orthogonal track 120 and the second orthogonal track 122 can be substantially parallel. Thus, each length span 110 of the orthogonal rails 106 can be configured to constrain two pallets 20 contemporaneously.

In some embodiments, the pallet tracks 114 can comprise one or more intersection region 125 that is configured to allow pallets 20 to change between rows or columns of the matrix of cells 108. For example, the first lateral track 116 and the second lateral track 118 can intersect the first orthogonal track 120. Additionally, the first lateral track 116 and the second lateral track 118 can intersect the second orthogonal track 122. Likewise, each of the first orthogonal track 120 and the second orthogonal track 122 can intersect the first lateral track 116 and the second lateral track 118. Accordingly, the first lateral track 116, the second lateral track 118, the first orthogonal track 120 and the second orthogonal track 122 can cooperate to form the intersection region 125, which can comprise a substantially rectangular region of grooves. located on one of the orthogonal rails 106. In some embodiments, the intersection region can be formed at each portion of the rectangular grid 100 adjacent to four corners of cells of the matrix of cells 108. Accordingly, the intersection regions 125 of the pallet tracks 114 can be utilized by pallets 20 to move from a current cell location in the matrix of cells 108 to any adjacent cell that is not occupied by a pallet 20 by moving in the positive x-direction, the negative x-direction, the positive y-direction, the negative y-direction, or combinations thereof with respect to the current cell location.

Figure 5:
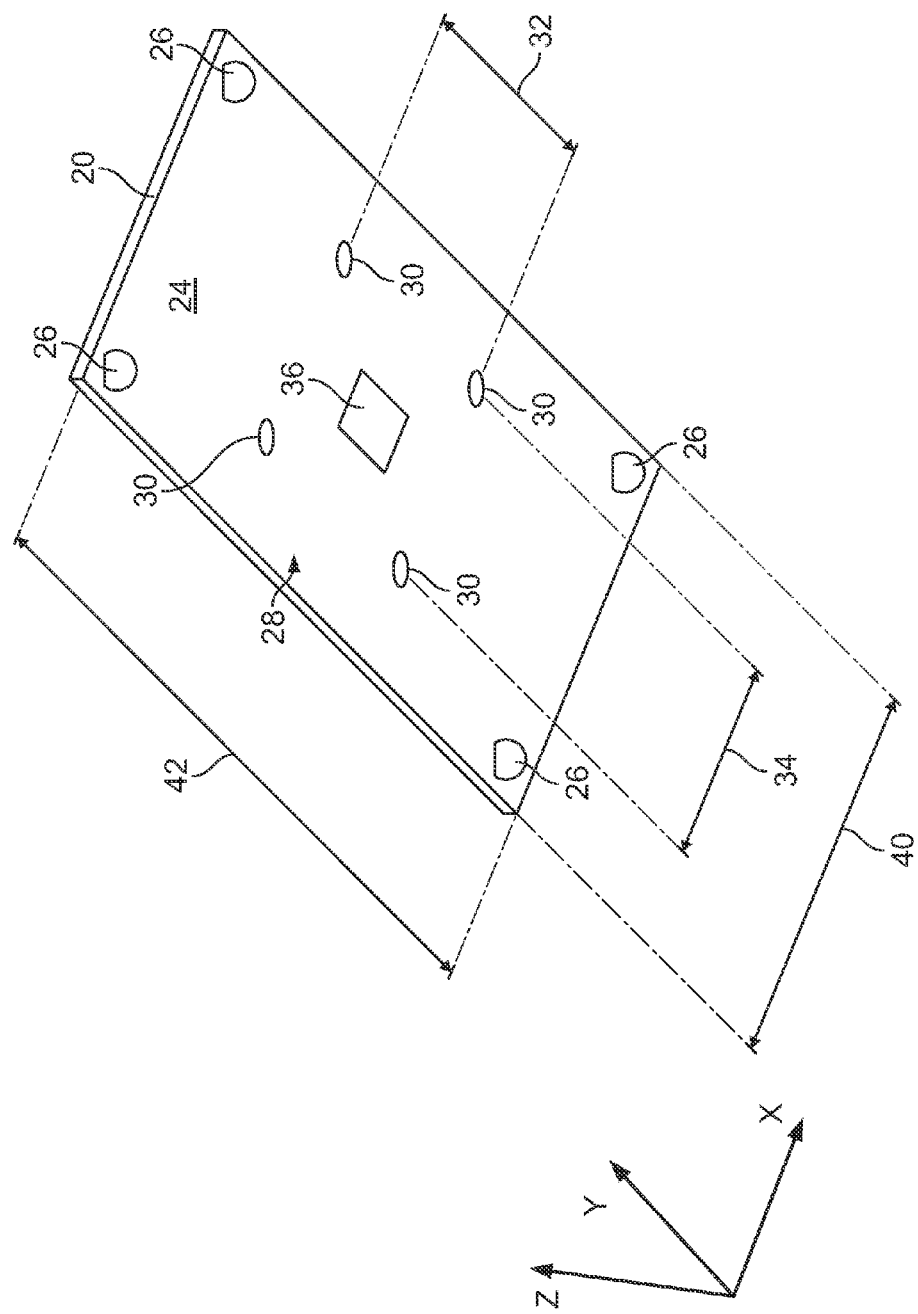
FIGS. 5-7 schematically depict pallets according to one or more embodiments shown and described herein.

Referring collectively to FIGS. 1, 2, and 5, the system 10 can comprise pallets 20 for storing and moving goods throughout the matrix of cells 108. Each of the pallets 20 can comprise a topside 22 which can be configured to support goods. In some embodiments, the topside 22 can comprise a surface that faces upwards, i.e., the topside 22 can be defined by a normal vector that is substantially aligned with the z-axis. Each of the pallets 20 can comprise an underside 24 that faces the rectangular grid 100 and is configured to interface with the rectangular grid 100 and the shuttle device 200. The underside 24 of the pallet 20 can be located on an opposite side of the pallet 20 compared to the topside 22. Accordingly, the topside 22 can be defined by a normal vector that is substantially aligned with the positive z-direction and the underside 24 can be defined by a normal vector that is substantially aligned with the negative z-direction. Each pallet 20 can be substantially rectangular. Accordingly, the pallet 20 can be defined by a width dimension 40 substantially along the x-axis, and a length dimension 42 substantially along the y-axis. It is noted that the pallet 20 can have any desired width dimension 40 and any desired length dimension 42 provided that the pallet 20 is correspondingly shaped to the cells of the matrix of cells 108.

Referring collectively to FIGS. 2, 4 and 5, the underside 24 of the pallet 20 can configured for sliding engagement with the rectangular grid 100. The sliding engagement can be provided by constraining each sliding member 26 within one of the pallet tracks 114. In some embodiments, each of the pallets 20 can comprise a sliding member 26 located on the underside 24 of the pallet 20. The sliding member 26 can be any device suitable to reduce the friction between the pallet 20 and the rectangular grid 100 such as, but not limited to, a roller bearing. In some embodiments, the underside 24 of each pallet 20 can comprise a plurality of sliding members 26. For example, the underside 24 of each pallet can comprise four of the sliding members 26. The sliding members 26 can be arranged in a substantially rectangular pattern that is substantially similar to the cell demarcated by the pallet tracks 114. Alternatively or additionally, each sliding member 26 can be positioned adjacent to a corner at the underside 24 of the pallet 20. Accordingly, the sliding members 26 can be in sliding engagement with the pallet tracks 114, while the pallet 20 occupies a cell.

As is noted above, the underside 24 of the pallet 20 can be configured to interface with the shuttle device 200. In some embodiments, the pallet 20 can comprise a shuttle engagement member 28 located on the underside 24 of the pallet 20. The shuttle engagement member 28 can comprise one or more latching features 30 that are configured to selectively engage with the shuttle device 200. The latching feature 30 can be configured to promote contemporaneous motion between the pallet 20 and the shuttle device 200 in the x-direction, the y-direction, or combinations thereof. Alternatively or additionally, the latching feature 30 can be configured to release the shuttle device 200 along the z-direction. In some embodiments, the latching feature 30 can be formed as an orifice that is bored into the underside 24 of the pallet 20 substantially along the z-direction. It is noted that, while the latching features 30 are depicted in FIG. 5 as being substantially circular, the latching feature 30 can be formed into any shape suitable to promote selective engagement with the shuttle device 200.

According to the embodiments described herein, the shuttle engagement member 28 can comprise four of the latching features 30 arranged at corners of a substantially rectangular pattern. In some embodiments, the latching features 30 can be separated by a length span 32 substantially along the y-axis. The length span 32 can be greater than a lateral rail span 124 of the lateral rails 104. Alternatively or additionally, the latching features 30 can be separated by a width span 34 substantially along the x-axis. The length span 32 can be greater than an orthogonal rail span 126 of the orthogonal rails 106. In some embodiments, length span 32 and the lateral span 34 can be substantially equal. Alternatively or additionally, the length span 32, the lateral span 34, or both can be shorter than the shortest length of the width dimension 40 or the length dimension 42. For example, the length span 32, the lateral span 34, or both can be less than about 50% of the shortest length such as, but not limited to, about one third of the shortest length. Applicants have discovered that controlling the length span 32, the lateral span 34, or both can improve stability during movement of the pallet 20.

Referring again to FIG. 5, each of the pallets 20 can be configured for unique identification. For example, each pallet 20 can comprise an identification device 36 that is encoded to uniquely identify the pallet 20, i.e., each pallet 20 can be individually addressed. The identification device 36 can be any machine decodable object such as, for example, a printed barcode, a radio frequency identification (RFID) tag, or the like. In some embodiments, the identification device 36 can be located on the underside 24 of the pallet 20. Alternatively or additionally, the identification device 36 can be positioned substantially centrally with respect to the width dimension 40 and the length dimension 42. In some embodiments, the identification device 36 can be positioned substantially centrally with respect to the shuttle engagement member 28 to facilitate improved accuracy in the positioning of the shuttle device 200 (FIG. 2).

Figure 7:
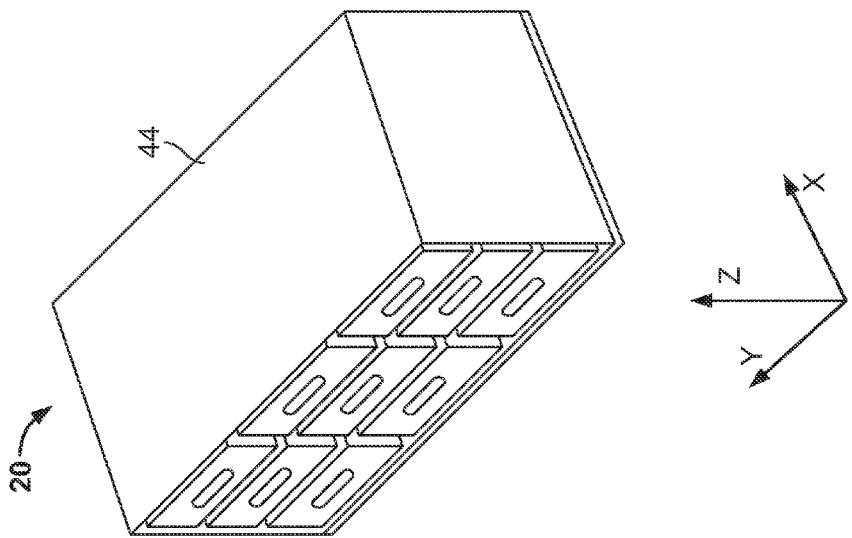
Figure 6:
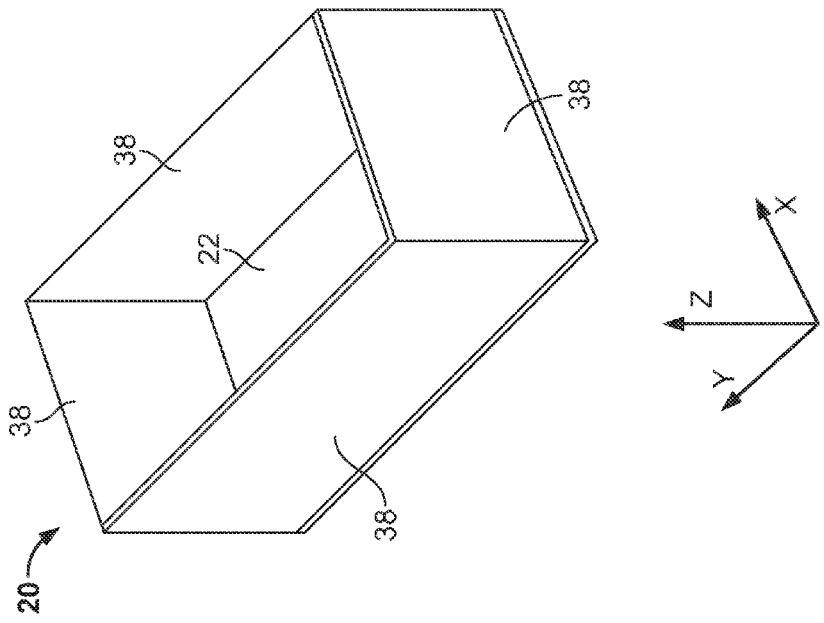

Referring again to FIGS. 1 and 2, one or more of the pallets 20 can comprise a topside 22 that forms a substantially planar surface, i.e., a flat-bed shelf. Referring to FIG. 6, in some embodiments, the pallet 20 can comprise one or more wall 38 that at least partially encloses a volume bounded by the topside 22 of the pallet 20, i.e., a box-style shelf. Referring to FIG. 7, in further embodiments, the pallet 20 can comprise a cabinet 44 that completely encloses a volume, i.e., a cabinet-style shelf. Alternatively or additionally, the cabinet 44 can be provided with one or more drawers, doors, or combinations thereof that provide access to the interior volume of the cabinet 44. According to the embodiments described herein, the pallets 20 can be provided as any combination that comprises one or more of a flat-bed shelf, a box-style shelf, and a cabinet-style shelf.

Referring collectively to FIGS. 1, 2, 8A and 8B, the system 10 can comprise a shuttle device 200 that is configured to selectively access and engage the pallets 20 arranged upon the rectangular grid 100. In some embodiments, the shuttle device 200 can comprise one or more vertical actuators 202. Each vertical actuator 202 can be operable to urge a pallet engagement member 204 vertically, i.e., motion substantially aligned with the z-axis. For example, the vertical actuator 202 can comprise a hydraulic pump and valves and be configured to hydraulically urge the pallet engagement member 204 vertically, i.e., the pallet engagement member 204 can comprise a piston in fluidic communication with the hydraulic pump. Alternatively or additionally, the vertical actuator 202 can comprise any servomechanism suitable for providing a controlled amount of force to urge the pallet engagement member 204. As used herein, the term "servomechanism" can mean any actuator that can be controlled with a signal such as, for example, a mechanical actuator, a hydraulic actuator, a pneumatic actuator, an electrical actuator, or combinations thereof. Furthermore, the term "signal" can mean a waveform (e.g., electrical, optical, magnetic, or electromagnetic), such as DC, AC, sinusoidal-wave, triangular-wave, square-wave, and the like, capable of traveling through a medium.

Referring collectively to FIGS. 5, 8A, and 8B, the shuttle device 200 can comprise four of the vertical actuators 202 and four of the pallet engagement members 204. The pallet engagement members 204 can be provided upon an upper face 206 of the shuttle device 200 in an arrangement that corresponds to the shuttle engagement member 28. Specifically, each of the pallet engagement members 208 can be provided at a corner of a substantially rectangular pattern upon the upper face 206 of the shuttle device 200. The pallet engagement members 204 can be separated by the length span 32 substantially along the y-axis. Alternatively or additionally, the pallet engagement members 204 can be separated by the width span 34 substantially along the x-axis. Accordingly, when the shuttle device 200 and the pallet 20 are aligned, each of the pallet engagement members 204 can be aligned with one of the latching features 30 of the shuttle engagement member 28. It is noted that, while the pallet engagement members 204 are depicted in FIG. 8A as being substantially cylindrically shaped, the pallet engagement members 204 can be provided in any shape that corresponds to the latching features 30.

In some embodiments, the shuttle device 200 can comprise an identification sensor 208 configured to detect the identification device 36 of the pallets 20. The identification sensor 208 generally comprises a non-contact or wireless sensor configured to detect the identification device 36 such as, for example, an optical sensor, a bar code reader, an RFID detector, or the like. It is noted that the term "sensor," as used herein, can mean a device that measures a physical quantity and converts it into a signal, which is correlated to the measured value of the physical quantity. Additionally, it should be understood that the term "optical" can refer to various wavelengths of the electromagnetic spectrum such as, but not limited to, wavelengths in the ultraviolet (UV), infrared (IR), and visible portions of the electromagnetic spectrum. In order to improve detection accuracy, the identification sensor 208 can be located on the upper face 206 of the shuttle device 200 in a position that corresponds to the location of the identification device 36, when the pallet engagement members 204 engage the latching features 30 of the pallet 20. For example, the identification sensor 208 can be substantially centered with respect to the pallet engagement members 204.

According to the embodiments described herein, the shuttle device 200 can comprise one or more distance sensors 210 that are configured to detect the position of the shuttle device 200. For example, the one or more distance sensors 210 can be configured to detect the position of the shuttle device 200 with respect to the x-axis. Alternatively or additionally, the one or more distance sensors 210 can be configured to detect the position of the shuttle device 200 with respect to the y-axis. The one or more distance sensors 210 can comprise any device capable of detecting position or length such as, for example, a laser distance sensor, a linear encoder, or the like.

Referring collectively to FIGS. 1, 2, and 9, the shuttle device 200 can be configured to travel beneath the rectangular grid 100. In some embodiments, the shuttle device 200 can be configured for motion along the x-axis, the y-axis, or a combination thereof. Specifically, the shuttle device 200 can be operably connected to a motive assembly 220 for motion along the x-axis, the y-axis, or a combination thereof. The motive assembly 220 can comprise structural components that are configured to constrain the motion of the shuttle device 220. For example, the motive assembly 220 can comprise a lateral dimension actuator 222 that moves the shuttle device 200 along the x-axis and an orthogonal dimension actuator 224 that moves the shuttle device 200 along the y-axis.

In some embodiments, the lateral dimension actuator 222, the orthogonal dimension actuator 224, or both can comprise a linear bearing. Specifically, the lateral dimension actuator 222 can comprise outer rails 226 and the orthogonal dimension actuator 224 can comprise inner rails 228. The outer rails 226 of the lateral dimension actuator 222 can be in sliding engagement with inner rails 228 of the orthogonal dimension actuator 224. Optionally, the outer rails 226 can extend substantially along the x-axis and the inner rails 228 can extend substantially along the y-axis. Alternatively, the outer rails 226 can extend substantially along the y-axis and the inner rails 228 can extend substantially along the x-axis. It is noted that providing the inner rails 228 along the longest dimension of the matrix of cells 108 can improve the operation of the system 10. In some embodiments, each of the outer rails 226 can be substantially parallel with respect to one another. Additionally, each of the inner rails 228 can be substantially parallel with respect to one another and can extend between the outer rails 226. During operation of the lateral dimension actuator 222, the outer rails 226 can be held substantially stationary as the inner rails 228 slide throughout rows of the matrix of cells 108. Accordingly, the lateral dimension actuator 222 can comprise a lateral servomechanism 230 that provides a force that urges the inner rails 228 into motion with respect to the outer rails 226. The lateral servomechanism 230 can be positioned upon the inner rails 228, the outer rails 226, or a combination thereof.

In some embodiments, the inner rails 228 of the orthogonal dimension actuator 224 can be in sliding engagement with the shuttle device 200. Specifically, the shuttle device 200 can comprise a plurality of roller bearings 232 that roll along the profile of the inner rails 228 to provide the sliding engagement. In some embodiments, the profile of each inner rail 228 can be formed by an I-beam. Roller bearings 232 can be provided at each side of the shuttle device 200 and confined within the profile of the inner rails 228. Alternatively or additionally, the upper face 206 of the shuttle device 200 can extend beyond the inner rails 228. Such an oversized upper face 206 can reduce the profile of the shuttle device 200 and provide additional stability. The orthogonal dimension actuator 224 can comprise an orthogonal servomechanism 234 that provides a force that urges the shuttle device 200 into motion with respect to the inner rails 228. The orthogonal servomechanism 234 can be positioned upon the shuttle device 200, the inner rails 228, or a combination thereof. Accordingly, the orthogonal servomechanism 234 can urge the shuttle device 200 along the rows of the matrix of cells 108. It is noted that, while the motive assembly 220 is depicted in FIGS. 1, 2, and 9 as comprising a particular type of linear bearing, the embodiments described herein are not so limited. It is contemplated that the motive assembly 220 can comprise any motion system suitable to urge the shuttle device 200 along the x-axis, the y-axis, or combinations thereof.

Referring collectively to FIGS. 1 and 2, the system 10 can comprise a controller 50 configured to direct the shuttle device 200 and the motive assembly 220 according to software modules and prioritization rules. Specifically, the controller 50 can be communicatively coupled to the shuttle device 200 and the motive assembly 220. The controller 50 can comprise one or more processors 52 for executing machine readable instructions and memory 54 for storing the machine readable instructions. The one or more processors 52 can be communicatively coupled to the memory 54. The one or more processors 52 comprise an integrated circuit, a microchip, a computer, or any other computing device capable of executing machine readable instructions. The memory 54 can comprise RAM, ROM, a flash memory, a hard drive, or any device capable of storing machine readable instructions.

In the embodiments described herein, the one or more processors 52, the memory 54, or both can be integral with the shuttle device 200, the motive assembly 220, or both. However, it is noted that the one or more processors 52, the memory 54, or both can be separate components communicatively coupled with one another without departing from the scope of the present disclosure. As used herein, the phrase "communicatively coupled" can mean that components are capable of exchanging data signals with one another such as, for example, electrical signals via conductive medium, electromagnetic signals via air, optical signals via optical waveguides, and the like.

Thus, embodiments of the present disclosure can comprise logic or an algorithm written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the logic or algorithm may be written in a hardware description language (HDL), such as implemented via either a field-programmable gate array (FPGA) configuration or an application-specific integrated circuit (ASIC), and their equivalents.

Referring still to FIGS. 1 and 2, the system 10 can comprise a plurality of pallets 20 arranged upon the matrix of cells 108 formed by the rectangular grid 100. The shuttle device 200 and the motive assembly 220 can be suspended below the rectangular grid 100 such that the rectangular grid 100 is positioned between the pallets 20 and the shuttle device 200. In some embodiments, the outer rails 226 of the motive assembly 220 can be fixed beneath the rectangular grid 100 and can span the extent of the rectangular grid 100. The motive assembly 220 can be operatively coupled to the shuttle device 200 and configured to align the shuttle device beneath any of the pallets 20 or cells of the matrix of cells 108.

As is noted above, the controller 50 can direct the operation of the shuttle device 200 to selectively position the pallets 20 throughout the matrix of cells 108. Specifically, the one or more processors 52 can execute machine readable instructions to automatically perform the processes described herein. The machine readable instructions can comprise address information associated with each cell of the matrix of cells 108. For example, each cell can be associated with coordinates that correspond to the position of the cell. In some embodiments, the coordinates can be indicative of the position of the center of the cell with respect to the x-axis and the y-axis. In embodiments with multiple levels, the coordinates can further be indicative of position with respect to the z-axis. Likewise, each pallet 20 can be associated with coordinates indicative of the position of the pallet. During operation, each pallet 20 can be mapped or associated with a cell of the matrix of cells 108. Accordingly, the controller 50 can track the position of each pallet 20 and identify any unoccupied cell 128 of the matrix of cells 108 that is unobstructed by the pallets 20.

Figure 10:
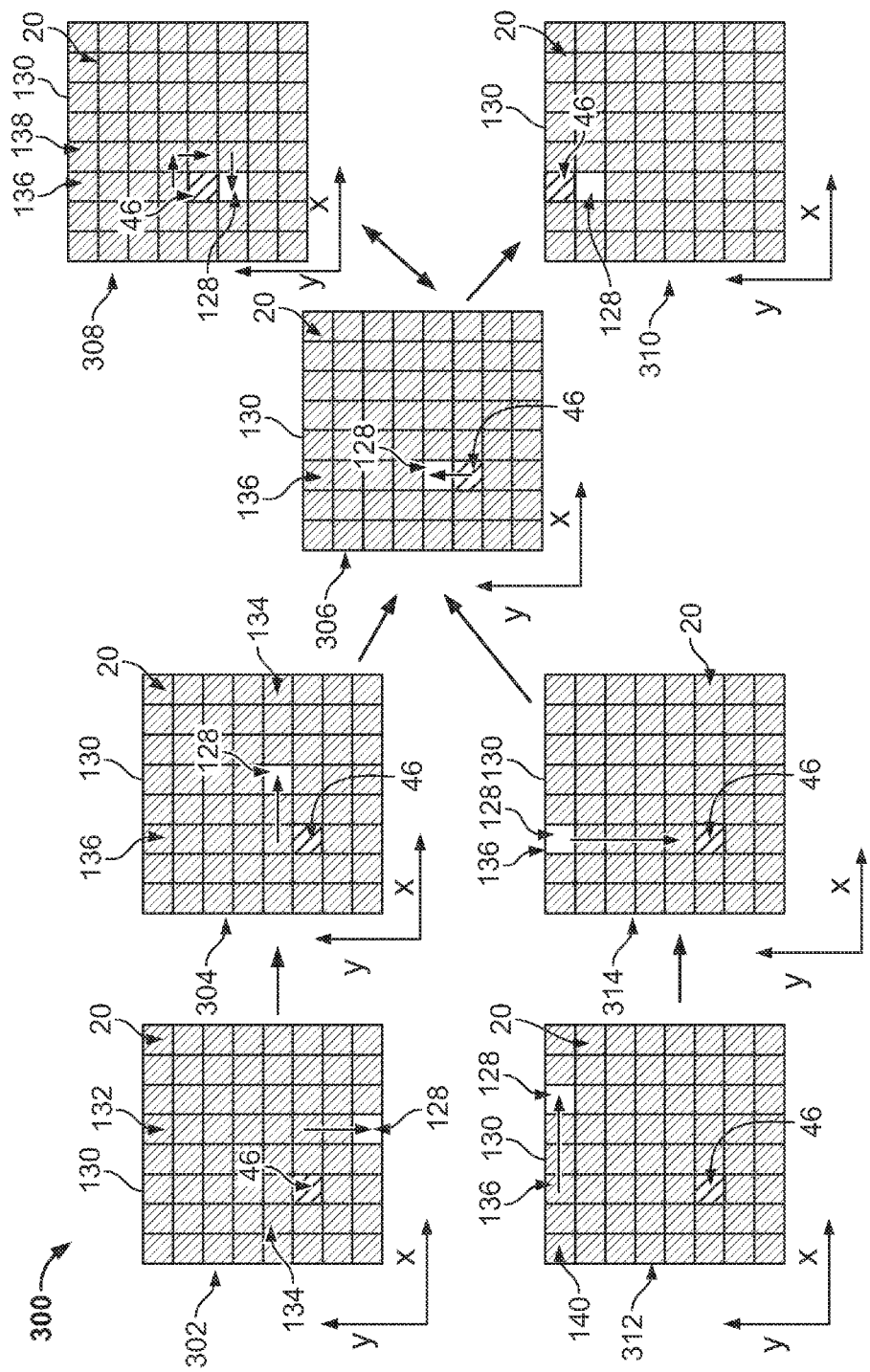
FIG. 10 schematically depicts a method for moving pallets according to one or more embodiments shown and described herein.

Referring collectively to FIGS. 1, 2 and 10, a method 300 for moving pallets 20 throughout the matrix of cells 108 is provided. Initially, a targeted pallet 46 of the pallets 20 can be determined automatically by the one or more processors 52. For example, the targeted pallet 46 can be associated with a desired good that has been marked for retrieval. Accordingly, each pallet 20 can be associated with a good within the memory 54 such that the targeted pallet 46 can be determined by identifying the desired good. Upon determining the position of the targeted pallet 46, the one or more processors 52 can automatically determine the position of the unoccupied cell 128 with respect to an exit position 130 and the targeted pallet 46. It is noted that, while the exit position 130 is depicted in FIGS. 1 and 10 as being a row, the exit position 130 can be any portion of the matrix of cells 108 where the pallet 20 can be accessed such as, for example, a column or a cell. It is furthermore noted that, while the methods described herein comprise a number of enumerated processes, the processes can be performed in any order or omitted without departing from the scope of the present disclosure.

If it is determined that the unoccupied cell 128 is further from the exit position 130 than the targeted pallet 46, the method 300 can proceed to process 302. At process 302, the column 132 that corresponds to unoccupied cell 128 can be identified. Each pallet 20 in the column 132 can be moved by the shuttle device 200 towards the unoccupied cell 128. Specifically, starting the pallet 20 nearest the unoccupied cell 128, the pallets 20 can be moved until the unoccupied cell 128 is positioned in a row 134, which is one row nearer to the exit position 130 than the targeted pallet 46. The method 300 can then proceed to process 304.

At process 304, each pallet 20 located in the row 134 between the unoccupied cell 128 and the targeted pallet 46 can be moved by the shuttle device 200 into the unoccupied cell 128. Specifically, starting with the pallet 20 nearest the unoccupied cell 128, the pallets 20 can be moved away from the targeted pallet 46 and into the unoccupied cell 128. The pallets 20 can be moved until the unoccupied cell 128 is positioned in the cell adjacent to the targeted pallet 46, i.e., the unoccupied cell 128 can be positioned in the same column 136 as the targeted pallet 46. The method 300 can then proceed to process 306.

Referring still to FIGS. 1, 2 and 10, at process 306, the target pallet 46 can be moved towards the exit position 130 and into the unoccupied cell 128. The one or more processors 52 can determine the position of the target pallet 46 with respect to the exit position 130. If the target pallet 46 is not at the exit position 130, the method 300 can then proceed to process 308. If the target pallet 46 is at the exit position 130, the method 300 can then proceed to process 310.

At process 308, each pallet 20 located adjacent to the targeted pallet 46 can be moved by the shuttle device 200 in a half circle movement. Specifically, pallets 20 adjacent and in the same column 136 or the adjacent column 138 of the targeted pallet 46 can be moved into the unoccupied cell 128. Specifically, starting with the pallet 20 nearest the unoccupied cell 128, the pallets 20 can be moved until the unoccupied cell 128 is positioned between the targeted pallet 46 and the exit position 130, i.e., the unoccupied cell 128 can be positioned in the same column 136 as the targeted pallet 46. The method 300 can then proceed to process 306.

At process 310, the targeted pallet 46 can be positioned within the exit position 130. Accordingly, the goods stored upon the targeted pallet 46 can be access by an access device that is configured to load or unload goods from the targeted pallet 46. Exemplary access devices include, but are not limited to, an elevator, an industrial lift, a conveyor, a picker, a fork truck, or the like.

In some embodiments, the unoccupied cell 128 can be closer to the exit position 130 than the targeted pallet 46 when the method 300 is initiated. In such instances, instead of process 302, the method 300 can proceed to process 312. At process 312, the row 140 that corresponds to unoccupied cell 128 can be identified. Each pallet 20 in the row 140 between the column 136 and the unoccupied cell 128 can be moved by the shuttle device 200 towards the unoccupied cell 128. Specifically, starting with the pallet 20 nearest the unoccupied cell 128, the pallets 20 can be moved until the unoccupied cell 128 is positioned in the column 136. The method 300 can then proceed to process 314.

At process 314, each pallet 20 located in the column 136 between the unoccupied cell 128 and the targeted pallet 46 can be moved by the shuttle device 200 towards the unoccupied cell 128. Specifically, starting with the pallet 20 nearest the unoccupied cell 128, the pallets 20 can be moved away from the targeted pallet 46 and into the unoccupied cell 128. The pallets 20 can be moved until the unoccupied cell 128 is positioned in the cell adjacent to the targeted pallet 46. The method 300 can then proceed to process 306.

Referring collectively to FIGS. 2, 5, 8A, 8B, and 11, a method 400 for moving pallets 20 to an adjacent cell is provided. The method 400 can comprise process 402 for initializing the shuttle device 200. At process 402, the shuttle device 200 can be prepared to access any selected one of the pallets 20. Generally, the pallet 20 that is selected can be located in a cell of the matrix of cells 108 that is adjacent to the unoccupied cell 128, before the pallet engagement member 204 of the shuttle device 200 and the shuttle engagement member 28 of the pallet 20 become engaged. Prior to moving the shuttle device 200, the shuttle engagement members 204 can be moved to the lowered position (FIG. 8A). Specifically, the one or more processors 52 can automatically actuate the vertical actuators 202 to ensure that the shuttle engagement members 204 are lowered. The method 400 can then proceed to process 404.

At process 404, the position of the unoccupied cell 128 can be verified by the one or more processors 52. As is noted above, the position of the unoccupied cell 128 can be provided to the one or more processors 52. For example, the position can be mapped by coordinates associated with the unoccupied cell 128. The shuttle device 200 can be directed towards the position of the unoccupied cell 128. Specifically, the one or more processors 52 can direct the motive assembly 220 to actuate in order to cause the shuttle device 200 to move to the position of the unoccupied cell 128. In some embodiments, the distance sensor 210 can detect a detected position of the shuttle device with respect to the coordinate system. Accordingly, the distance sensor 210 can be utilized to provide feedback, i.e., the one or more processors 52 can compare the mapped position of the unoccupied cell 128 to the detected position observed by the distance sensor 210. Once the shuttle device 200 is appropriately positioned, the identification sensor 208 can be utilized to verify that the unoccupied cell 128 is unobstructed by the pallets 20. The method 400 can then proceed to process 406.

At process 406, the position of the pallet 20 that is selected for movement can be verified by the one or more processors 52. Specifically, the one or more processors 52 can automatically move the shuttle device 200 to the mapped location of the pallet 20 with the motive assembly 220. In some embodiments, the one or more processors 52 can direct the motive assembly 220 to mapped locations based on a feed forward control, i.e., the one or more processors 52 can be configured to determine the location of the shuttle device 200 based only upon a known position of the shuttle device 200 and subsequent inputs provided to the motive assembly 220. Optionally, the distance sensor 210 can detect the position of the shuttle device 200. Accordingly, the one or more processors 52 can compare the detected position to the mapped location of the pallet 20 or feed forward location of the shuttle device 200 for feedback control. Once the shuttle device 200 is positioned within detection range of the pallet 20, the method 400 can then proceed to process 408.

At process 408, the one or more processors 52 can automatically align the shuttle device 200 and the pallet 20. Specifically, the identification sensor 208 can detect the identification device 36 of the pallet 20. The identification sensor 208 can communicate data indicative of the identification device 36 of the pallet 20. The data can be decoded by the one or more processors 52 to determine the relative position of the pallet 20 and the shuttle device 200. Accordingly, the one or more processors 52 can actuate the motive assembly 220 to provide alignment suitable for engagement. For example, the center of each of the pallet 20 and the shuttle device 200 can be aligned. The method 400 can then proceed to process 410.

Referring collectively to FIGS. 5, 8A, 8B, and 11, at process 410, the one or more processors 52 can cause the shuttle device 200 to engage the pallet 20. Specifically, the one or more processors 52 can cause the vertical actuators 202 to actuate to transition the pallet engagement members 204 from a lowered position (FIG. 8A) to a raised position (FIG. 8B). As the pallet engagement members 204 are transitioned, the pallet engagement members 204 can engage the shuttle engagement member 28 disposed on the underside 24 of the pallet 20. Specifically, each pallet engagement members 204 can interlock with a corresponding latching feature 30 of the shuttle engagement member 28. Since the pallet 20 is in sliding engagement with the rectangular grid 100, movement of the pallets 20 can be provided without lifting the pallet 20 from the rectangular grid 100. Accordingly, the pallet engagement members 204 can be configured to engage the shuttle engagement member 28 without providing a force that urges the pallet 20 and the rectangular grid 100 apart. The method 400 can then proceed to process 412.

Referring collectively to FIGS. 2, 5, 8A, 8B, and 11, at process 412, the pallet 20 can be moved towards the unoccupied cell 128, while the shuttle device 200 avoids the rectangular grid 100. For example, the shuttle device 200 can cause the pallet 20 to slide towards the unoccupied cell 128, while the pallet engagement members 204 of the shuttle device 200 and the shuttle engagement member 28 of the pallet 20 are engaged. Movement of the shuttle device 200 and the pallet 20 can be provided along a direction of motion. The one or more processors 52 can determine or be provided with the direction of motion. Accordingly, the one or more processors 52 can identify a leading set 236 of the pallet engagement members 204 and a trailing set 238 of the pallet engagement members 204 based at least in part upon the direction of motion. Specifically, the leading set 236 of the pallet engagement members 204 can be the pallet engagement members 204 nearest to intersection with the rectangular grid 100 along the direction of motion. The trailing set 238 of the pallet engagement members 204 can be the pallet engagement members 204 that are furthest from the rectangular grid 100 along the direction of motion. For example, should the direction of motion be in the positive y-direction, the leading set 236 and the trailing set 238 of the pallet engagement members 204 can be identified as depicted in FIGS. 8A and 8B. It should be understood that the leading set 236 and the trailing set 238 of the pallet engagement members 204 are dependent upon and change with the direction of motion.

The direction of motion and the current position of the shuttle device 200 can be utilized to identify an intersecting rail from the lateral rails 104 and orthogonal rails of the rectangular grid 100. The intersecting rail can be defined as the nearest rail of the rectangular grid 100 to the shuttle device 200 along the direction of motion. Generally, the intersecting rail can be orthogonal to the direction of motion. As the shuttle device 200 and the pallet 20 to slide towards the unoccupied cell 128, the intersecting rail can be traversed by sequentially actuating the pallet engagement members 204. Specifically, the leading set 236 of the pallet engagement members 204 can be disengaged from the shuttle engagement member 28 as the leading set 236 of the pallet engagement members 204 approached the intersecting rail. The pallet 20 can slide over the intersecting rail and the shuttle device 200 can travel under the intersecting rail, while the shuttle engagement member 28 of the pallet 20 is engaged with the trailing set 238 of the pallet engagement members 204 and the shuttle engagement member 28 of the pallet 20 is disengaged with the leading set 236 of the pallet engagement members 204.

The pallet 20 can continue to slide over the intersecting rail and the shuttle device 200 can continue to travel under the intersecting rail. When the leading set 236 of the pallet engagement members 204 are clear of the intersecting rail and prior to the trailing set 238 of the pallet engagement members 204 contacting the intersecting rail, the leading set 236 of the pallet engagement members 204 can re-engage the shuttle engagement member 28 of the pallet 20 and the trailing set 238 of the pallet engagement members 204 can disengage the shuttle engagement member 28 of the pallet 20. The pallet 20 can slide over the intersecting rail and the shuttle device 200 can travel under the intersecting rail, while the trailing set 238 of the pallet engagement members 204 are disengaged from the shuttle engagement member 28 and the leading set 236 of the pallet engagement members 204 are engaged with the shuttle engagement member 28 of the pallet 20. The pallet 20 can continue to slide over the intersecting rail and the shuttle device 200 can continue to travel under the intersecting rail. When the trailing set 238 of the pallet engagement members 204 are clear of the intersecting rail, the trailing set 238 of the pallet engagement members 204 can re-engage the shuttle engagement member 28 of the pallet 20. Accordingly, both the leading set 236 and the trailing set 238 of the pallet engagement members 204 can be engaged with the shuttle engagement member 28 of the pallet 20 after the pallet engagement members 204 are clear of the intersecting rail. The method 400 can then proceed to process 414.

At process 414, the pallet 20 can be delivered to the unoccupied cell 128. Specifically, the shuttle device 200 can continue to slide the pallet 20 until the pallet 20 is positioned upon the unoccupied cell 128. In some embodiments, the distance sensor 210 can detect a detected position shuttle device 200, which can be utilized to verify that the pallet 20 has been properly delivered. Once the pallet 20 is delivered, both the leading set 236 and the trailing set 238 of the pallet engagement members 204 can be disengaged from the shuttle engagement member 28 of the pallet 20, i.e., placed in the lowered position (FIG. 8A). It is noted that the method 400 can be utilized to move the pallets to an adjacent cell in any direction such as, for example, the positive x-direction, the negative x-direction, the positive y-direction, or the negative y-direction. It is furthermore noted that each movement of the pallet 20 described above with respect to method 300 can comprise one or more process described herein with respect to the method 400.

Referring again to FIGS. 1 and 2, the machine readable instructions stored in the memory 54 can comprise a storage algorithm that arranges the pallets 20 according to the goods associated with the pallets 20. The storage algorithm can comprise restrictions that are automatically enforced by the one or more processors 52. The restrictions can restrict the pallets 20 that can be stored adjacently according to the associated goods. For example, the storage rules may prevent household items from being stored adjacent to food items. Alternatively or additionally, the storage algorithm can track demand history for goods within a database stored in memory 54. The storage algorithm can place pallets 20 with respect to the exit position 130 based upon the demand for the associated good, i.e., goods with higher demand can be stored closer to the exit location 130 than goods with less demand. Alternatively or additionally, the storage algorithm can arrange pallets according to groups. Specifically, the associated goods can be grouped according to goods that are frequently retrieved at the same time, i.e., sub components of an assembly may frequently be retrieved contemporaneously (e.g., components need to build an engine). In some embodiments, the storage algorithm can be configured to run offline, i.e., within a defined time frame that corresponds to an idle period. Accordingly, the arrangement of the pallets 20 can be performed without conflicting with picking requests or storage requests.

Figure 12:
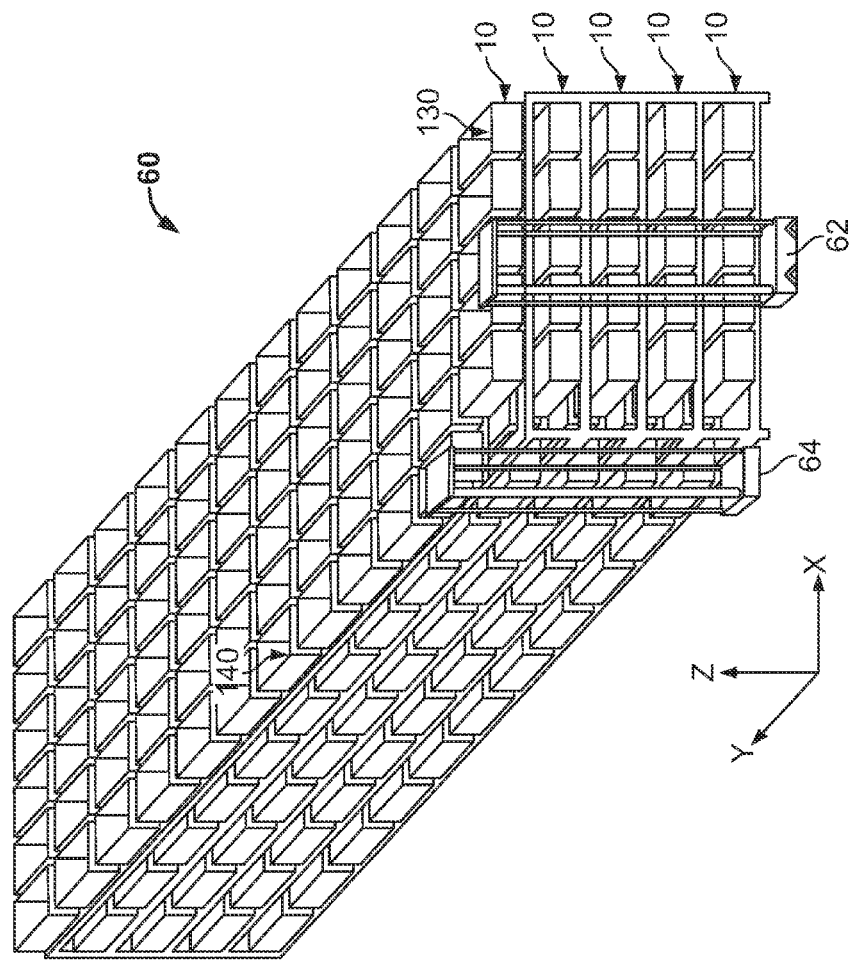
FIG. 12 schematically depicts a warehouse according to one or more embodiments shown and described herein.
Figure 11:
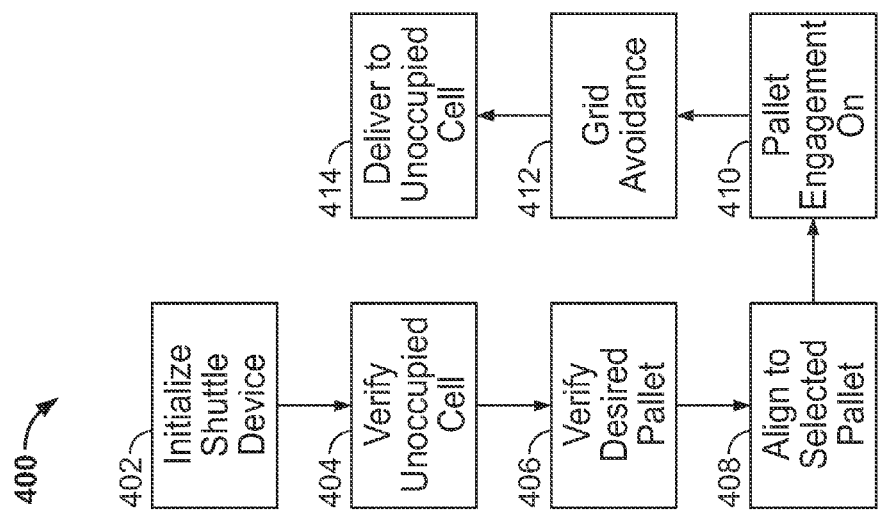
FIG. 11 schematically depicts a method for moving a pallet to an adjacent cell according to one or more embodiments shown and described herein.

Referring collectively to FIGS. 1, 2 and 12, the system 10 can be provided within a warehouse 60 for increasing the storage utilization of the warehouse 60. In some embodiments, the warehouse 60 can comprise multiple floors or levels, which can each be provided above one another along the z-axis. Each floor of the warehouse 60 can comprise or be formed from the system 10. For example, each floor of the warehouse 60 can comprise a plurality of pallets 20 provided upon the rectangular grid 100. In some embodiments, the exit position 130 of the floors can be provided as a row of the rectangular grid 100 along the x-axis. The warehouse 60 can comprise a row retrieval device 62 such as, for example, an elevator or industrial lift. The row retrieval device 62 can be configured to move pallets 20 from the exit position 130 throughout the various floors of the warehouse 60. Alternatively or additionally, the exit position 140 of the floors can be provided as a column of the rectangular grid 100 along the y-axis. The warehouse 60 can comprise a column retrieval device 64 configured to move pallets 20 from the exit position 140 throughout the various floors of the warehouse 60.

It should now be understood, the embodiments described herein can be utilized within a warehouse facility to decrease the amount of wasted storage volume. For example, a typical warehouse may waste about 40% of the storage space due to the space consumed by roads between storage racks. In embodiments of the present disclosure utilizing a column exit and a column retrieval device, the amount of storage space waste can be reduced to about 21%. Moreover, in embodiments of the present disclosure utilizing a row exit and row retrieval device, the amount of storage space waste can be reduced to about 1%. Accordingly, the storage capability of the warehouses according to the embodiments described herein can be relatively large compared to a typical warehouse. Furthermore, the automated systems provided herein improve accuracy by reducing human interaction, e.g., human errors are decreased and instances of expired goods due to human error are reduced. Additionally, goods can be retrieved with greater speed due to the use of the offline organization techniques provided herein.

It is noted that directional references such as, for example, x-direction, y-direction, z-direction, x-axis, y-axis, z-axis, x-z plane and the like have been provided for clarity and without limitation. Specifically, it is noted such directional references are made with respect to the coordinate system depicted in FIGS. 1-10 and 12. Thus, the directions may be reversed or oriented in any direction by making corresponding changes to the provided coordinate system and the associated structure to extend the examples described herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for moving pallets comprising:
   a rectangular grid comprising lateral rails oriented along an x-axis and orthogonal rails oriented along a y-axis, wherein the lateral rails and the orthogonal rails intersect to demarcate a matrix of cells;
   pallets arranged upon the matrix of cells of the rectangular grid, wherein each of the pallets comprises an underside that faces the rectangular grid and a shuttle engagement member located on the underside, and wherein the shuttle engagement member comprises latching features that are each arranged at a corner of a rectangular pattern;
   a shuttle device suspended beneath the pallets and the rectangular grid, wherein the shuttle device comprises a vertical actuator that urges a pallet engagement member vertically;
   a motive assembly suspended beneath the pallets and the rectangular grid, wherein the motive assembly moves the shuttle device; and
   one or more processors communicatively coupled to the shuttle device and the motive assembly, wherein the one or more processors execute machine readable instructions to:
   activate the vertical actuator to urge the pallet engagement member of the shuttle device into engagement with the shuttle engagement member of a selected pallet of the pallets; and
   actuate the motive assembly to slide the selected pallet along the rectangular grid, while the pallet engagement member of the shuttle device and the shuttle engagement member of the selected pallet are engaged.

2. The system of claim 1, wherein the rectangular grid comprises pallet tracks that constrain the pallets in sliding engagement with the rectangular grid.

3. The system of claim 2, wherein the pallet tracks comprises a first lateral track and a second lateral track located on one of the lateral rails, and wherein the first lateral track and the second lateral track demarcate different cells of the matrix of cells.

4. The system of claim 2, wherein the pallet tracks comprises a first orthogonal track and a second orthogonal track located on one of the orthogonal rails, and wherein the first orthogonal track and the second orthogonal track demarcate different cells of the matrix of cells.

5. The system of claim 2, wherein each of the pallets comprises a sliding member located on the underside, and wherein the sliding member of each of the pallets is constrained by one of the pallet tracks.

6. The system of claim 5, wherein the sliding member comprises a ball bearing.

7. The system of claim 1, wherein:
the matrix of cells comprises an unoccupied cell that is unobstructed by the pallets;
the selected pallet is positioned in a cell of the matrix of cells that is adjacent to the unoccupied cell, before the pallet engagement member of the shuttle device and the shuttle engagement member of the selected pallet are engaged; and
wherein the selected pallet slides towards the unoccupied cell, while the pallet engagement member of the shuttle device and the shuttle engagement member of the selected pallet are engaged.

8. The system of claim 1, wherein the motive assembly comprises a lateral dimension actuator that moves the shuttle device along the x-axis and an orthogonal dimension actuator that moves the shuttle device along the y-axis.

9. The system of claim 8, wherein the lateral dimension actuator, the orthogonal dimension actuator, or both comprise a linear bearing.

10. The system of claim 1, wherein the vertical actuator is a hydraulic actuator.

11. The system of claim 1, wherein the rectangular grid is provided as a floor of a warehouse.

12. The system of claim 1, wherein the underside of each of the pallets is rectangular and comprises identification device that is positioned centrally.

13. The system of claim 1, wherein the pallets comprise a flat-bed shelf, a box-style shelf, a cabinet-style shelf, or a combination thereof.

14. A method for moving pallets, the method comprising:
engaging a shuttle engagement member disposed on an underside of a pallet with pallet engagement members of a shuttle device, wherein the pallet is in sliding engagement with a rectangular grid that demarcates a matrix of cells, and wherein the underside of the pallet faces the rectangular grid;
moving the shuttle device beneath the rectangular grid and along a direction of motion;
sliding the pallet along rectangular grid, while the shuttle engagement member of the pallet is engaged with the pallet engagement members of the shuttle device;
identifying, automatically with one or more processors, a leading set of pallet engagement members and a trailing set of pallet engagement members from the pallet engagement members based at least in part upon the direction of motion, wherein the one or more processors is communicatively coupled to a distance sensor of the shuttle device and a motive assembly;
providing a mapped location of a selected cell of the matrix of cells;
moving, automatically with the one or more processors, the shuttle device to the mapped location with the motive assembly;
detecting a detected position of the shuttle device with the distance sensor; and
comparing, automatically with the one or more processors, the mapped location and the detected position.

15. The method of claim 14, wherein the rectangular grid comprises an intersecting rail that is orthogonal to the direction of motion, and the method further comprises:
disengaging the leading set of pallet engagement members from the shuttle engagement member as the pallet slides over the intersecting rail and while the shuttle engagement member of the pallet is engaged with the trailing set of pallet engagement members.

16. The method of claim 14, wherein the rectangular grid comprises an intersecting rail that is orthogonal to the direction of motion, and the method further comprises:
disengaging the trailing set of pallet engagement members from the shuttle engagement member as the pallet slides over the intersecting rail and while the shuttle engagement member of the pallet is engaged with the leading set of pallet engagement members.

17. The method of claim 14, comprising:
detecting an identification device located on the underside of the pallet with an optical sensor of the shuttle device.

18. A warehouse comprising one or more processors and multiple floors, wherein each of the floors of the warehouse comprises:
a rectangular grid comprising lateral rails oriented along an x-axis and orthogonal rails oriented along a y-axis, wherein the lateral rails and the orthogonal rails intersect to demarcate a matrix of cells;
pallets arranged upon the matrix of cells of the rectangular grid, wherein each of the pallets comprises an underside that faces the rectangular grid and a shuttle engagement member located on the underside, and wherein the shuttle engagement member comprises latching features that are each arranged at a corner of a rectangular pattern;
a shuttle device communicatively coupled to the one or more processors and suspended beneath the pallets and the rectangular grid, wherein the shuttle device comprises a vertical actuator that urges a pallet engagement member vertically;
a motive assembly communicatively coupled to the one or more processors and that moves the shuttle device, and wherein the one or more processors execute machine readable instructions to:
activate the vertical actuator to urge the pallet engagement member of the shuttle device into engagement with the shuttle engagement member of a selected pallet of the pallets; and
actuate the motive assembly to slide the selected pallet along the rectangular grid, while the pallet engagement member of the shuttle device and the shuttle engagement member of the selected pallet are engaged.

* * * * *